(12) United States Patent  
Sebaa et al.

(10) Patent No.: US 9,194,300 B2  
(45) Date of Patent: Nov. 24, 2015

(54) AIRCRAFT CONTROL AND MONITORING SYSTEM

(75) Inventors: Jerome Guy Roger Sebaa, Alfortville (FR); Fabrice Bon, Savigny le Temple (FR)

(73) Assignee: SNECMA, Paris (FR)

( * ) Notice: Subject to any disclaimer, the term of this patent is extended or adjusted under 35 U.S.C. 154(b) by 40 days.

(21) Appl. No.: 14/232,736

(22) PCT Filed: Jul. 6, 2012

(86) PCT No.: PCT/FR2012/051596
§ 371 (c)(1),
(2), (4) Date: Jan. 14, 2014

(87) PCT Pub. No.: WO2013/011222
PCT Pub. Date: Jan. 24, 2013

(65) Prior Publication Data
US 2014/0199158 A1   Jul. 17, 2014

(30) Foreign Application Priority Data

Jul. 18, 2011 (FR) ..................... 11 56494

(51) Int. Cl.
*F02C 9/18* (2006.01)
*F02C 6/08* (2006.01)

(52) U.S. Cl.
CPC ... *F02C 9/18* (2013.01); *F02C 6/08* (2013.01); *F05D 2270/303* (2013.01)

(58) Field of Classification Search
None
See application file for complete search history.

(56) References Cited

U.S. PATENT DOCUMENTS

| | | | | |
|---|---|---|---|---|
| 4,691,760 A | * | 9/1987 | Gupta et al. | 165/234 |
| 6,058,725 A | * | 5/2000 | Monfraix et al. | 62/172 |
| 7,618,008 B2 | * | 11/2009 | Scherer et al. | 244/117 R |
| 2007/0267060 A1 | * | 11/2007 | Scherer et al. | 137/13 |
| 2009/0235670 A1 | * | 9/2009 | Rostek et al. | 60/785 |
| 2010/0147399 A1 | | 6/2010 | Buhring | |
| 2010/0192593 A1 | | 8/2010 | Brown et al. | |
| 2011/0129332 A1 | | 6/2011 | Behaghel et al. | |

FOREIGN PATENT DOCUMENTS

| | | |
|---|---|---|
| DE | 10 2006 023 498 | 11/2007 |
| EP | 0 934 876 | 8/1999 |
| EP | 2 213 864 | 8/2010 |
| WO | 2010 000691 | 1/2010 |

OTHER PUBLICATIONS

International Search Report Issued Oct. 17, 2012 in PCT/FR12/051596 filed Jul. 6, 2012.

* cited by examiner

*Primary Examiner* — Rami Khatib
(74) *Attorney, Agent, or Firm* — Oblon, McClelland, Maier & Neustadt, L.L.P.

(57) ABSTRACT

A system for bleeding air on an aircraft, including: at least one air bleed valve that can bleed a flow of air on the aircraft, a first temperature information module, a second temperature information module, at least one control module, and at least one data processing module coupled to the control module.

12 Claims, 5 Drawing Sheets

AIRCRAFT CONTROL AND MONITORING SYSTEM

BACKGROUND OF THE INVENTION

1. Field of the Invention

The invention relates to a system and a method for controlling and monitoring an aircraft, and more particularly a system for controlling the temperature of air taps and for monitoring the exceeding of a predefined temperature threshold in an aircraft.

2. Description of the Related Art

A known aircraft such as, for example, an airplane, comprises a fuselage containing a cockpit deck and a passenger cabin and at least one engine set. Such an engine set comprises an engine and a fan from which air tappings can be made. Such tappings are made by a system, called air tapping system, comprising a plurality of valves and a precooler. These valves make it possible to tap air in various air flows circulating in or around the engine, for example a flow of air at high pressure, at high temperature, tapped on the engine, a flow of air at intermediate pressure, at lower temperature, also tapped on the engine and a fan air flow, cold, tapped on the fan. The flow of air at high pressure and the flow of air at intermediate pressure can be mixed into a mixed flow supplied to the precooler. The precooler then allows for heat exchange between the mixed flow and the fan air flow making it possible to lower the temperature of the mixed flow at the precooler outlet so as to supply, for example to the cockpit or to the passenger cabin of the aircraft, a flow with a regulated temperature.

Such regulation is obtained by controlling the opening of one or more of the air flow tapping valves. The temperature of the air flow can be regulated by the selection of one or more valves to be controlled, for example, by controlling the opening or the closing of the fan air flow tapping valve.

A system is known in which, on the one hand, a control of the temperature is made in order to allow for the opening or the closing of one or more valves and, on the other hand, a monitoring of the exceeding of a predefined temperature threshold is performed in order to allow for the closure of one or more valves, for example hot air tapping valves, or the opening of one or more valves, for example cold air tapping valves, in case said threshold is exceeded. Such exceeding occurs, for example, when the temperature of tapped air intended for the cockpit is too high, this type of incident being classified as catastrophic in terms of aircraft safety.

A known air tapping system comprises a thermostat, connected directly to one or more valves and making it possible to control the temperature of air tappings on said valve or valves, the opening of the valve or valves being modulated by the thermostat signal. Such a thermostat does, however, induce inaccuracies in the temperature measurements and therefore, by extension, in their control.

One existing solution consists in placing a temperature sensor to measure the temperature of the flow coming from the precooler and report this measurement to an air tapping system management computer, dedicated to the air tapping system. The duly obtained measurement then enables the computer to perform both the control of the air tapping temperature and the monitoring of the exceeding of a predefined temperature threshold by the temperature of the air tapping. The use of such a measurement does, however, induce a common mode problem. In practice, since the control and monitoring depend, in such a case, simultaneously on the same temperature measurement, an incorrect measurement implies both a poor control of the air tapping temperature and a poor monitoring of the exceeding of a predefined air tapping temperature threshold, which presents a problem in terms of aircraft safety.

BRIEF SUMMARY OF THE INVENTION

The aim of the invention is to partly eliminate these drawbacks. To this end, it relates to an air tapping system of an aircraft, said system comprising:
- at least one air tapping valve suitable for tapping an air flow on the aircraft,
- a first temperature information module configured to determine and send, over a first acquisition channel, first tapped air flow temperature information,
- a second temperature information module configured to determine and send, over a second acquisition channel, second tapped air flow temperature information,
- at least one management module, coupled to a data processing module and configured to:
- receive, on the one hand, over the first acquisition channel, the first tapped air flow temperature information allowing for a corresponding air tapping valve control and/or, on the other hand, over the second acquisition channel, the second tapped air flow temperature information making it possible to monitor the exceeding of a predefined tapped air flow temperature threshold,
- send the first temperature information and the second temperature information,
- at least one data processing module, coupled to the management module, and configured to:
- receive, over a first processing channel, the first tapped air flow temperature information and allow for a corresponding air tapping valve control,
- receive, over a second processing channel, the second tapped air flow temperature information making it possible to monitor the exceeding of a predefined tapped air flow temperature threshold and allow the closure of at least one air tapping valve in case said threshold is exceeded.

The term "tapping an air flow on the aircraft" should be understood here to mean the act of tapping air from a flow circulating, for example, on the fan or the engine of the aircraft.

The "acquisition channel" should be understood to mean a communication channel suitable for allowing for the transmission of information sent by an information module.

A "processing channel" should be understood to mean a communication channel suitable for allowing for the transmission of information to a processing module, a processing channel being able to be identical to, that is to say merged with, an acquisition channel.

"Temperature information" should be understood to mean a measurement of the temperature or a status of exceeding of a temperature threshold.

The term "determine" should be understood to mean to measure a temperature or establish a status of exceeding of a predefined temperature threshold by the temperature of the tapped air flow.

The "status of exceeding of a temperature threshold" should be understood to mean a binary or Boolean result of the "threshold exceeded" or "threshold not exceeded" type. A status can be a binary value or, for example, take the form of a discrete value.

It will be noted that a threshold can be set at a given instant but can subsequently be modified, for example to enable the module to operate in a degraded mode.

The temperature information received from the management module by the data processing module can thus comprise, for example, a value corresponding to a temperature measurement or to a status of exceeding of a predefined temperature threshold.

Such a system thus makes it possible to both control the air tapping temperature and monitor the exceeding of a predefined air tapping temperature threshold based on two temperature information items obtained via two distinct acquisition channels. In other words, the first information module makes it possible to acquire first temperature information in order to perform the control function whereas the second information module makes it possible to acquire second temperature information in order to perform the monitoring function. There is therefore no longer any common mode between the control and the monitoring. Furthermore, the control and the monitoring are performed on the basis of precise temperature information such as measurements or given states of exceeding of a predefined temperature threshold.

Advantageously, the system comprises a high pressure air tapping valve, an intermediate pressure air tapping valve, a fan air tapping valve and a precooler, the tapped air flow on the high pressure air tapping valve being mixed with the tapped air flow on the intermediate pressure air tapping valve to obtain a mixed flow at the precooler inlet, the precooler being suitable for recooling said mixed flow by heat exchange with the flow of air tapped on the fan air tapping valve.

Preferably, the first temperature information module is configured to measure and send, over the first acquisition channel, a first tapped air flow temperature measurement and the second temperature information module is configured to measure and send, over the second acquisition channel, a second tapped air flow temperature measurement or to determine and send, over the second acquisition channel, a status of exceeding of a predefined temperature threshold by the temperature of the tapped air flow.

According to a feature of the invention, the management module comprises:
  an analysis module configured to convert the measurement of the temperature of the tapped air flow received into a numeric value and/or to compare the information on the temperature of said tapped air flow received with a predefined threshold, and
  a sending module configured to send the numerical value and/or the result of the comparison.

In particular, the management module can be suitable for converting an analog temperature measurement received in a digital value that can be used, for example, by a processor or by a Field-Programmable Gate Array (FPGA).

Advantageously, the aircraft comprises a computer and the management module and the data processing module are implemented by said computer. A computer comprises, as is known, information processing means configured to process data and implement computer programs. The computer can be, for example, the engine computer of the aircraft which is used to manage information on the operation of the engine or engines of the aircraft. The use of the aircraft engine computer makes it possible to avoid the use of an additional computer dedicated to managing the air tapping system of the aircraft and therefore to perform the control of the air tapping system of the aircraft and of the engine in a centralized manner.

According to one feature of the invention, the first temperature information module is configured to measure and send, over the first acquisition channel, a first tapped air flow temperature measurement, the second temperature information module is configured to measure and send, over the second acquisition channel, a second tapped air flow temperature measurement, and the management module is suitable for receiving, from the first temperature information module, over the first acquisition channel, said first measurement and, from the second temperature information module, over the second acquisition channel, said second measurement, the management module being coupled to a processing module and the first and the second processing channels being identical.

The first information module thus makes it possible to acquire a first temperature measurement in order to perform the control function whereas the second information module makes it possible to acquire a second temperature measurement in order to perform the monitoring function, the two measurements being sent, in this case, by the single management module to a single processing module that are interlinked by a single channel. The two temperature information items are thus separated as far as the management module.

According to one feature of the invention, the system also comprises a second management module coupled to a second data processing module by a third and a fourth identical processing channels, and coupled, on the one hand, to the first temperature information module and, on the other hand, to the second temperature information module, the second management module being suitable for receiving, from the first temperature information module, over a third acquisition channel, the first measurement and, from the second temperature information module, over a fourth acquisition channel, the second measurement.

Such a configuration makes it possible, for example, to combine, on a first physical channel, for example of a computer, the first channel and the second channel, each reporting a temperature measurement from a different temperature information module (respectively from the first and from the second temperature information modules), and, on a second physical channel, the first channel and the second channel, each reporting a temperature measurement from a different temperature information module (respectively from the first and from the second temperature information modules). The use of two physical channels makes it possible to divide up the management function of the management module so that, if one of the management modules malfunctions, the other will be able to ensure the function thereof.

According to another feature of the invention, the first temperature information module is configured to measure and send, over the first acquisition channel, a first tapped air flow temperature measurement, the second temperature information module is configured to determine and send, over the second acquisition channel, a status of exceeding of a predefined temperature threshold by the temperature of the tapped air flow, and the management module is configured to receive, over the first acquisition channel, the temperature measurement and, over the second acquisition channel, the exceeding status, the first and the second processing channels being identical.

The first information module thus makes it possible to acquire a temperature measurement in order to perform the control function whereas the second information module makes it possible to acquire a status of exceeding of a predefined temperature threshold in order to perform the monitoring function, the two information items being sent, in this case, by the single management module to a single processing module that are interlinked by a single channel. The two temperature information items are thus separated as far as the management module.

According to another feature of the invention, the first temperature information module is configured to measure and send, over the first acquisition channel, a first tapped air flow temperature measurement, the second information module is configured to determine and send, over the second acquisition channel, a status of exceeding of a predefined temperature threshold by the temperature of the tapped air flow, the management module is configured to receive, over the first acquisition channel, the temperature measurement and the data processing module is configured to receive, over the second acquisition channel, the exceeding status, the second acquisition channel and the second processing channel being identical.

The first information module thus makes it possible to acquire a temperature measurement in order to perform the control function whereas the second information module makes it possible to acquire a status of exceeding of a predefined temperature threshold in order to perform the monitoring function. In this case, only the measurement is sent to the single management module, the status being sent directly by the second information module to the single data processing module. The two temperature information items are thus separated as far as the data processing module.

According to another feature of the invention, the first temperature information module is configured to measure and send, over the first acquisition channel, a first tapped air flow temperature measurement, the second temperature information module is configured to determine and send, over the second acquisition channel, a status of exceeding of a predefined temperature threshold by the temperature of the tapped air flow, the management module is configured to receive, over the first acquisition channel, the temperature measurement and, over the second acquisition channel, the exceeding status, the second acquisition channel and the second processing channel being distinct.

The first information module thus makes it possible to acquire a temperature measurement in order to perform the control function whereas the second information module makes it possible to acquire a status of exceeding of a predefined temperature threshold in order to perform the monitoring function. In this case, the two temperature information items are sent to the single management module, but the measurement is sent to the single processing module over a first processing channel and the status is sent to the single data processing module over a second processing channel, which allows the two temperature information items to be separated as far as the data processing module.

According to another feature of the invention, the system comprises a first data processing module configured to receive, over the first processing channel, the first temperature information, and a second data processing module configured to receive, over the second processing channel, the second temperature information.

The control of the air tapping temperature and the monitoring of the exceeding of a predefined air tapping temperature threshold can thus be separated between two data processing modules, that is to say, for example, between two computers of the aircraft, which makes it possible to increase the safety of the aircraft given that the failure of one of the computers only results in the loss of one of the control or monitoring functions.

According to another feature of the invention, the second data processing module is configured to send the second temperature information to the first data processing module. This status can be sent directly or, for example, via a communication module.

According to another feature of the invention, the system also comprises a third data processing module configured to receive, over a third processing channel, the first temperature information.

This makes it possible, by splitting one of the processing modules, to secure the acquisition of the first temperature information.

The invention also relates to a method for managing an air tapping system in an aircraft, said aircraft comprising an air tapping system of an aircraft, said system comprising:
 at least one air tapping valve suitable for tapping an air flow on the aircraft,
 a first temperature information module configured to determine and send, over a first acquisition channel, first tapped air flow temperature information,
 a second temperature information module configured to determine and send, over a second acquisition channel, second tapped air flow temperature information,
 at least one management module, coupled to a data processing module and configured to:
 receive, on the one hand, over the first acquisition channel, the first tapped air flow temperature information allowing for a corresponding air tapping valve control and/or, on the other hand, over the second acquisition channel, the second tapped air flow temperature information making it possible to monitor the exceeding of a predefined tapped air flow temperature threshold,
 send the first temperature information and the second temperature information,
 at least one data processing module, coupled to the management module, and configured to:
 receive, over a first processing channel, the first tapped air flow temperature information and allow for a corresponding air tapping valve control,
 receive, over a second processing channel, the second tapped air flow temperature information making it possible to monitor the exceeding of a predefined tapped air flow temperature threshold and allow for the closure of at least one air tapping valve in case said threshold is exceeded,
the method comprising the steps of:
 tapping a flow of air at least partly on the valve,
 receiving, on the management module, from the first temperature information module, the first temperature information of said tapped air flow,
 receiving, on the management module or the data processing module, from the second temperature information module, the second temperature information of said tapped air flow,
 receiving, on the data processing module, the first temperature information and/or the second temperature information,
 controlling, on the data processing module, the opening or the closing of one or more air tapping valves as a function of the first temperature information and/or the second temperature information.

BRIEF DESCRIPTION OF THE SEVERAL VIEWS OF THE DRAWINGS

The features and advantages of the present invention will become more clearly apparent on reading the following description of an embodiment of the invention, given as a nonlimiting example, with reference to the corresponding attached drawings (identical references relating to similar objects) in which.

DETAILED DESCRIPTION OF THE INVENTION

The system according to the invention is described above with reference to temperature measurements or states of exceeding of a predefined temperature threshold. It will however be noted that the present invention can also be applied to other measurements, for example to pressure measurements or to states of exceeding of a predefined pressure threshold in order, identically, to control the opening and/or the closing of valve(s) of the air tapping system of an aircraft.

Figure 1A:
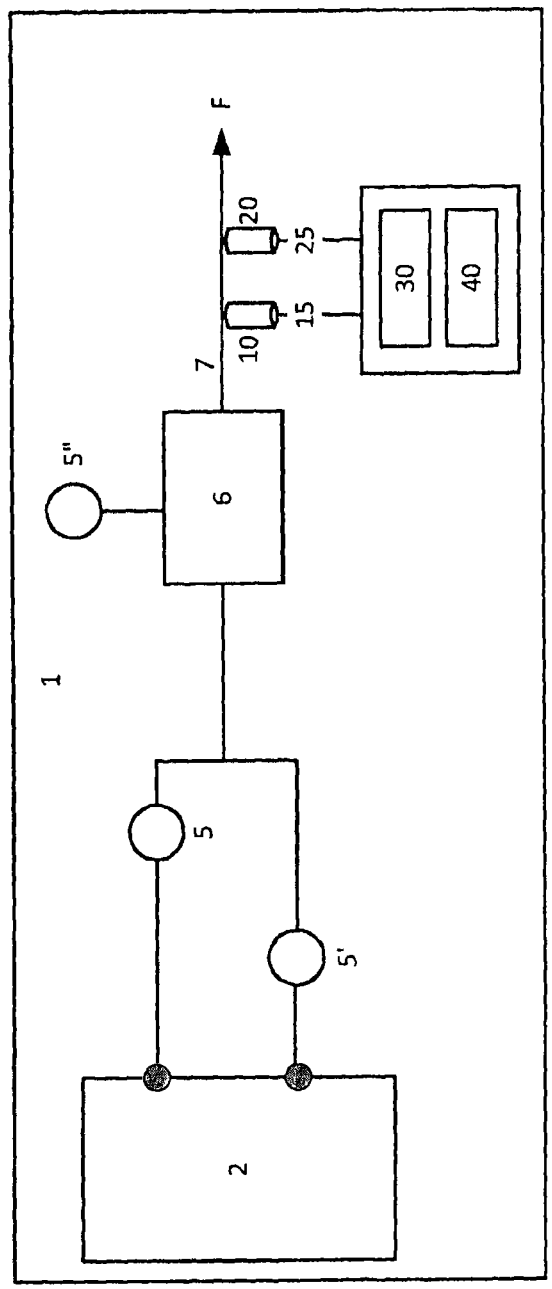
FIG. 1a illustrates the system according to the invention.

The air tapping system 1 of an aircraft according to the invention, illustrated by FIG. 1a, comprises two air tapping valves 5 and 5' in an air flow circulating on an engine 2 of the aircraft and an air tapping valve 5" of a flow circulating on the fan of said engine 2 of the aircraft.

The valve 5 can, for example, be a tapping valve in an air flow at intermediate pressure tapped on the engine whereas the valve 5' can be, for example, a tapping valve in an air flow at high pressure, of higher temperature and also tapped on the engine. The valve 5" makes it possible to tap a cold air flow directly on the fan, upstream of the engine 2 of the aircraft.

The air flows tapped by the air tapping valves 5, 5' on the engine are mixed into a mixed flow upstream of a precooler 6. The precooler allows for a heat exchange between the mixed flow and the fan air flow making it possible to lower the temperature of the resulting mixed flow F at the precooler outlet. The resulting mixed flow F at regulated temperature is routed by a duct 7, for example via an air conditioning system, to the cockpit or to the passenger cabin or for deicing the wings of the aircraft.

Such regulation is obtained by controlling the opening of one or more air flow tapping valves 5, 5', 5". In particular, the temperature of the air flow can be regulated by controlling the opening or the closing of the fan air flow tapping valve 5" and/or by selecting the valve or valves 5, 5', 5" to be controlled.

The system 1 also comprises a first temperature information module 10, a second temperature information module 20, at least one management module 30 and at least one data processing module 40 coupled to the management module 30.

The first temperature information module 10 is configured to measure and send, over a first acquisition channel 15, a first temperature measurement of the tapped air flow F circulating in the duct 7.

The second temperature information module 20 is configured to measure and send, over a second acquisition channel 25, a second temperature measurement of the tapped air flow F circulating in the duct 7 or to determine and send, over the second acquisition channel 25, a status of exceeding of a predefined temperature threshold by the temperature of the tapped air flow F circulating in the duct 7.

The management module(s) 30 is/are coupled to at least one data processing module 40 and configured to send to said data processing module 40 temperature information received from the first temperature information module 10 and from the second temperature information module 20.

The data processing module(s) 40 is/are coupled to the management module 30 and is/are configured to send commands to control the opening or closing of one or more of the air tapping valves 5, 5', 5" as a function of the information received from the management module 30 or from a temperature information module (10,20).

The data processing module 40 can comprise or be coupled to a memory (not represented) configured to store computer programs. Such programs can be designed to allow for the processing of the temperature information and to send the opening and closing commands for valves 5, 5', 5" of the air tapping system of the aircraft.

For example, in order to perform the control function, the data processing module 40 can measure the difference between a received temperature and a reference temperature and allow a proportional actuation of one of the valves, for example the fan air tapping valve.

Similarly, for example, in order to perform the monitoring function, the data processing module 40 can determine whether a received measurement exceeds a threshold or even if a received status indicates an exceeding condition to allow for an actuation to close the fan air tapping valve.

Thus, in the system according to the invention, the management module makes it possible notably to acquire and format temperature information and the data processing module makes it possible to analyze temperature information received from the management module and possibly actuate one or more of the valves of the air tapping system of the aircraft. The actuation of the air tapping valves can be done by the processing module 40 itself or else the processing module can send an alert message to another module or system, such as, for example, a module for monitoring the cabin of the airplane such that the pilot can manually actuate elsewhere the actuation of one or more air tapping valves.

In one embodiment of the system according to the invention, the valves 5, 5', 5" can be controlled remotely by the data processing module 40 or by another module of the aircraft, such as, for example, a module for manual monitoring by a pilot. In an alternative embodiment, a valve, for example the air tapping valve at intermediate pressure, can be independent and can be, for example, a spring-operated pneumatic valve which is self-regulated according to the pressure of its terminals, the data processing module then being suitable for controlling the other two valves.

Figure 1B:
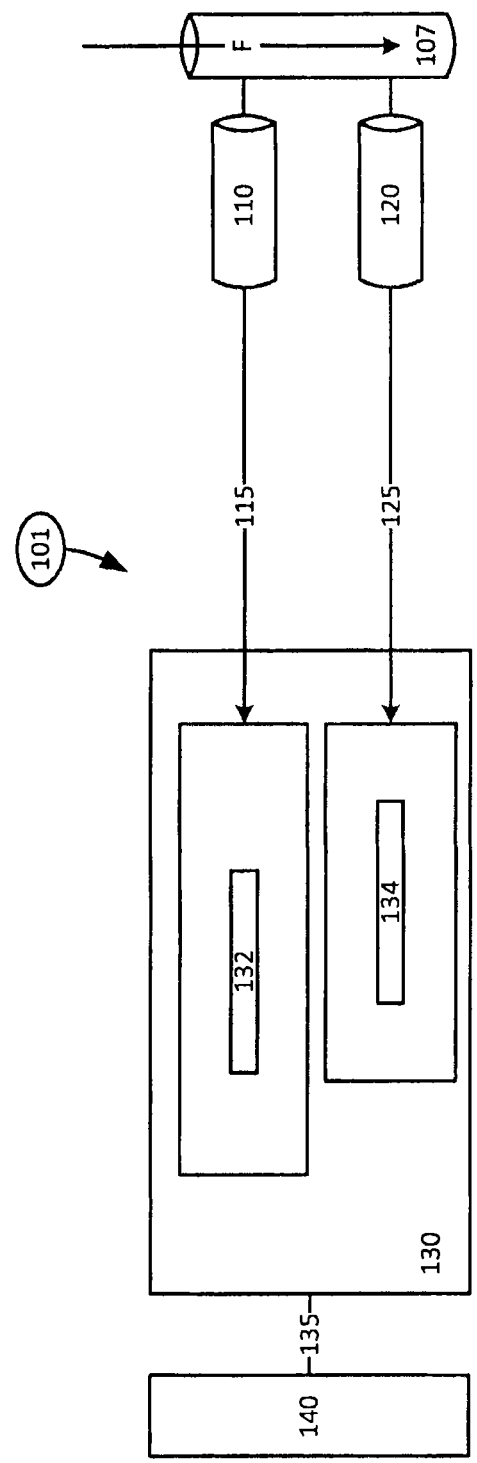
FIG. 1b illustrates a first embodiment of the system according to the invention.

In a first embodiment illustrated by FIG. 1b, the system 101 comprises a first temperature information module 110, a second temperature information module 120, a management module 130 and a data processing module 140.

The first temperature information module 110 can be, for example, a temperature measurement probe. The second temperature information module 120 can be, for example, a second measurement probe or else a thermocouple, known to a person skilled in the art.

The management module 130 is coupled or connected, on the one hand, to the first temperature information module 110 and, on the other hand, to the second temperature information module 120.

In this embodiment, the first temperature information module 110 and the second temperature information module 120 are two temperature measurement probes. The first temperature information module 110 and the second temperature information module 120 are thus configured to measure the temperature of the tapped air flow F circulating in the duct 107 of the air tapping system 101.

The management module 130 is suitable for receiving, from the first measurement probe 110, over a first acquisition channel 115, a first tapped air flow temperature measurement M1, and, from the second measurement probe 120, over a second acquisition channel 125, a second tapped air flow temperature measurement M2.

The management module 130 comprises temperature control means 132 configured to supply to the data processing module 140, via a processing channel 135, the temperature measurement M1 supplied by the first temperature information module 110.

The data processing module 140 is configured to process the received measurement M1 and allow the control of one or more valves 5, 5', 5", that is to say their closing or opening, in order to allow the temperature of the air flow F to be adjusted to a desired value.

The management module 130 also comprises means 134 for monitoring a status of exceeding of a predefined temperature threshold by the temperature of the tapped air flow. These monitoring means 134 are configured to supply the second measurement M2, obtained from the second probe 120, to the data processing module 140 via the processing channel 135.

The data processing module 140 is configured to determine the threshold exceeding status, that is to say if the temperature corresponding to the second measurement M2 has exceeded a predetermined threshold.

Figure 1C:
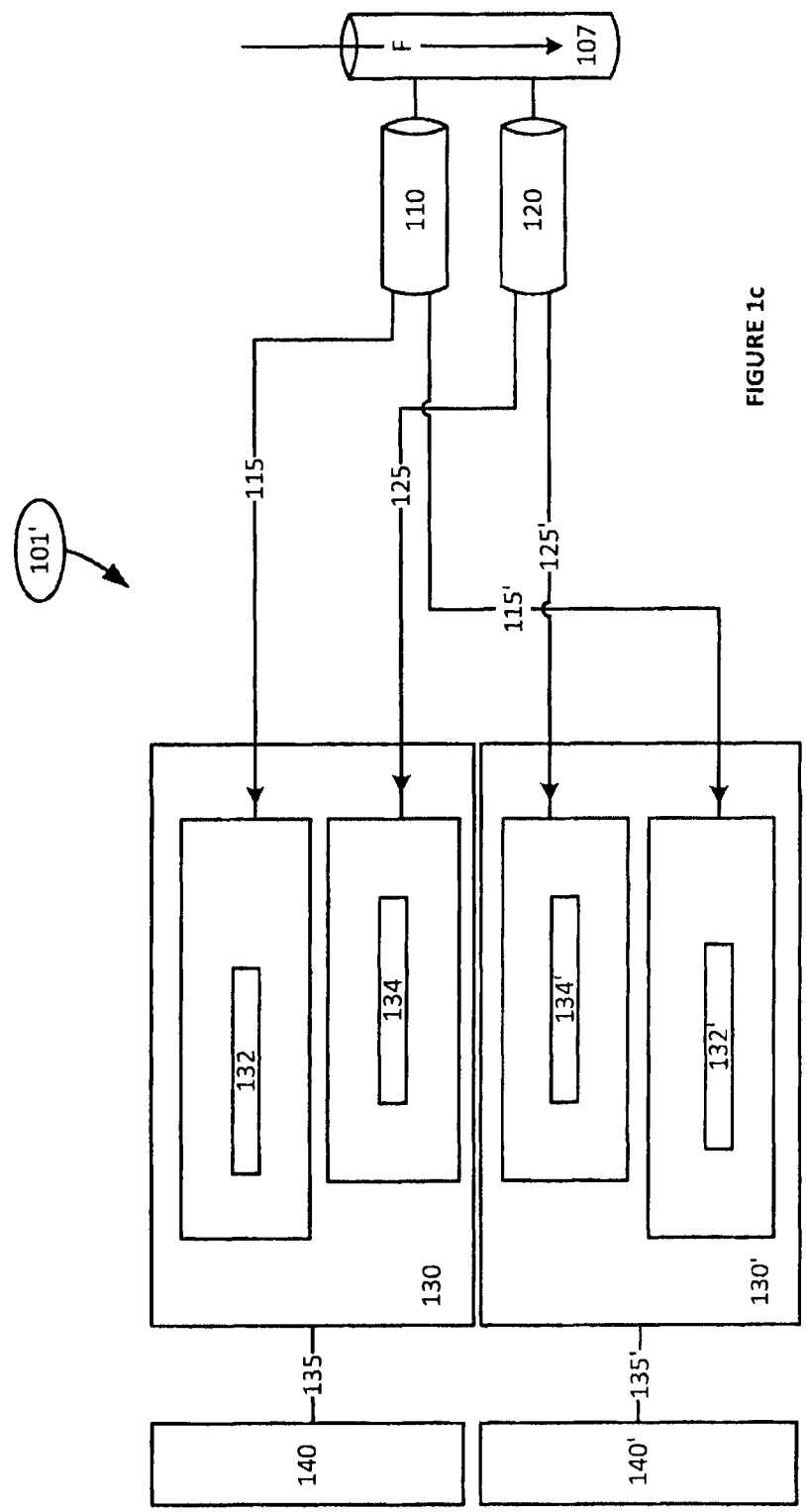
FIG. 1c illustrates a second embodiment of the system according to the invention.

In an embodiment, illustrated by FIG. 1c, complementing the first embodiment illustrated by FIG. 1b, the system can comprise a second management module 130', identical to the module 130, and a second data processing module 140', identical to the module 140 and coupled to the management module 130', and a third acquisition channel 115' and a fourth acquisition channel 125'. The modules 130 and 140 and the means 132 and 134 are thus divided into two like the acquisition channels 115 and 125.

The first management module 130 is coupled or connected, on the one hand, to the first temperature information module 110 and, on the other hand, to the second temperature information module 120.

The second management module 130' is coupled or connected, on the one hand, by the third acquisition channel 115', to the first temperature information module 110 and, on the other hand, by the fourth acquisition channel 125', to the second temperature information module 120.

In this embodiment, the first temperature information module 110 and the second temperature information module 120 are two temperature measurement probes.

The first management module 130 is suitable for receiving, from the first measurement probe 110, over the first acquisition channel 115, a first tapped air flow temperature measurement M1, and, from the second measurement probe 120, over the second acquisition channel 125, a second tapped air flow temperature measurement M2.

The second management module 130' is suitable for receiving, from the first measurement probe 110, over the third acquisition channel 115', the first tapped air flow temperature measurement M1, and, from the second measurement probe 120, over the fourth acquisition channel 125', the second tapped air flow temperature measurement M2.

The first management module 130 comprises temperature control means 132 configured to supply to the data processing module 140, via the processing channel 135, the temperature measurement M1 supplied by the first temperature information module 110. The data processing module 140 then processes the received measurement so as to allow for an aircraft air tapping valve control in order to adjust the temperature of the air flow F.

The first management module 130 also comprises means 134 for monitoring a status of exceeding of a predefined temperature threshold by the temperature of the tapped air flow F. The monitoring means 134 then supply, via the processing channel 135, the second measurement M2, obtained from the second probe 120, to the data processing module 140 which then uses, to perform the monitoring function, the threshold exceeding status to make it possible, or not, to control the valves 5, 5', 5".

Similarly, the second management module 130' comprises temperature control means 132' configured to supply to the data processing module 140', via the processing channel 135', the temperature measurement M1 supplied by the first temperature information module 110. The data processing module 140' then processes the received measurement so as to allow for an aircraft air tapping valve 5, 5', 5" control in order to adjust the temperature of the air flow F.

The second management module 130' also comprises means 134' for monitoring a status of exceeding of a predefined temperature threshold by the temperature of the tapped air flow.

The monitoring means 134' then supply, via the processing channel 135', the second measurement M2, obtained from the second probe 120, to the data processing module 140' which then uses, to perform the monitoring function, the threshold exceeding status to make it possible, or not, to control the valves 5, 5', 5".

This embodiment of the system according to the invention therefore makes it possible to report the temperature measurements M1 and M2 measured respectively by the probes 110 and 120 over four acquisition channels instead of two. In other words, each measurement is reported twice, via different acquisition channels and to different data processing modules. Such redundancy of the modules and of the channels makes it possible to reinforce the dependability of the control and of the monitoring given that the loss of one of the modules does not result in the loss of the two measurements useful to the control and monitoring functions which remain on the other management module. Such an architecture can easily be implemented on a computer of the aircraft, for example a so-called "engine" computer. Such a known computer can in fact comprise two data processing modules each communicating over a physical data communication channel. The management modules can be installed on the computer, coupled on the one hand to their respective data processing module and each linked on the other hand to two probes by two channels, the two channels linked to one and the same probe being on one and the same physical communication channel of the computer.

FIGS. 2 to 6 illustrate five other embodiments of the system according to the invention, but, for the purpose of clarification, the valves and the flow F are not represented. Furthermore, as for the embodiment illustrated by FIG. 1c in relation to the embodiment illustrated by FIG. 1b, each of the embodiments illustrated by FIGS. 3 to 7 can be divided into two similarly, mutatis mutandis, for the purpose of securing the system. These doubled forms are not represented in the interests of clarity.

Figure 2:
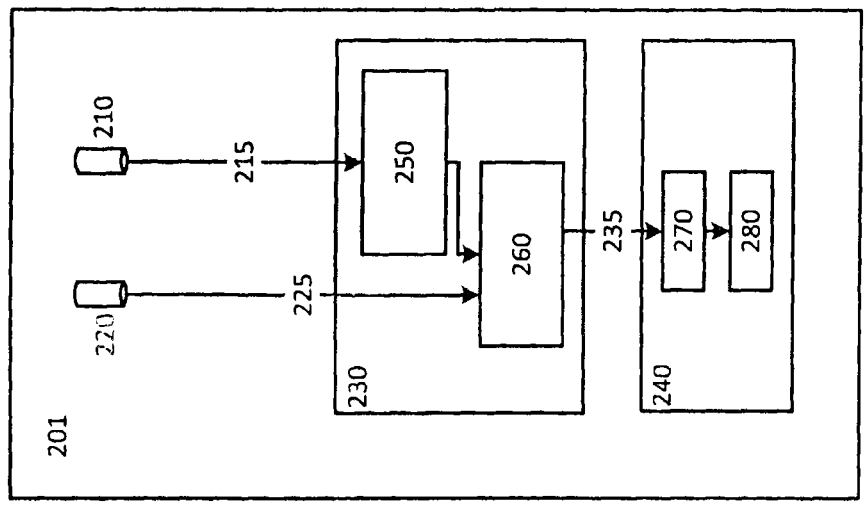
FIG. 2 illustrates a third embodiment of the system according to the invention.

In a third embodiment illustrated by FIG. 2, the system 201 comprises a temperature measurement probe 210, a temperature threshold exceeding status information module 220, a management module 230 and a processing module 240.

The management module 230 is connected to the measurement probe 210 by a first acquisition channel 215, on the one hand, and to the information module 220 by a second acquisition channel 225, on the other hand.

The management module 230 is configured to receive, over the first channel 215, a tapped air flow temperature measurement, measured by the temperature measurement probe 210 and, over the second channel 225, a status of exceeding of a predefined tapped air flow temperature threshold, determined by the information module 220.

The management module 230 comprises an analog-digital converter 250 and a Field-Programmable Gate Array (FPGA) 260. The analog-digital converter 250 is configured to convert the analog temperature measurement received from the temperature measurement probe 210 into a digital value, so that it can be used by processing means such as a Field-Programmable Gate Array (FPGA) or a processor.

The digital value thus obtained is then supplied to the Field-Programmable Gate Array (FPGA) 260 for processing. In particular, the Field-Programmable Gate Array (FPGA) 260 is configured to format the signals comprising the digital values received from the analog-digital converter 250 and states received from the information module 220 and detect failures or errors on said signals.

The status of exceeding of a predefined tapped air flow temperature threshold, determined by the information module 220, can, for example, take the form of a discrete comprising a circuit or a binary or Boolean value. For example, the low state of the discrete (circuit open) can correspond to an air flow temperature above the threshold, and the high state (circuit closed) can correspond to a threshold not reached, or vice versa. A binary result could, for example, be a 0 or 1 received via a digital bus from another information module (another computer for example). This exceeding status is supplied, by the information module 220, directly to the Field-Programmable Gate Array (FPGA) 260 for processing.

The data processing module 240 comprises a second Field-Programmable Gate Array (FPGA) 270 and a processor 280. The FPGA 260 communicates, via a processing channel 235, with the FPGA 270 coupled to the processor 280 for the processor 280 to process the data received from the management module 230. In other words, the FPGA 270 ensures, in particular, the management of the communications between the management module 230 and the processor 280.

Figure 3:
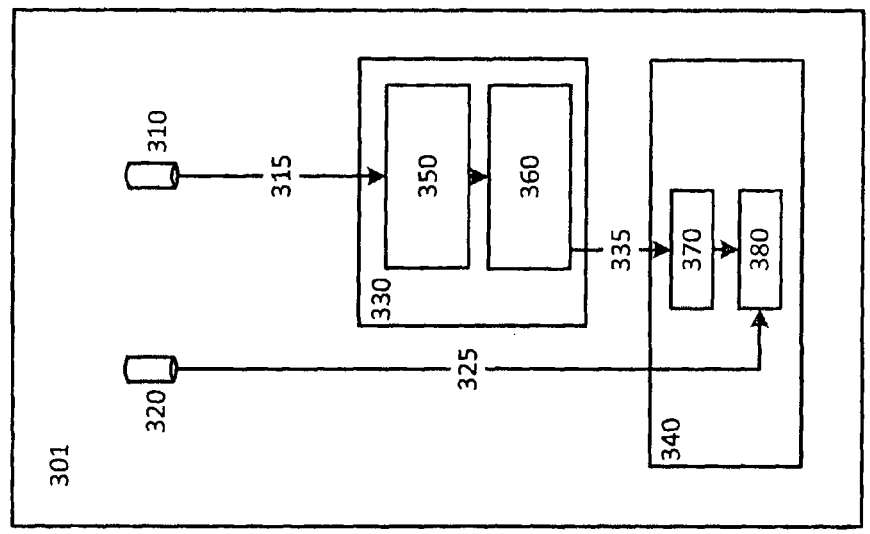
FIG. 3 illustrates a fourth embodiment of the system according to the invention.

In a fourth embodiment illustrated by FIG. 3, the system 301 comprises a temperature measurement probe 310, a temperature threshold exceeding status information module 320, a management module 330 and a data processing module 340.

The management module 330 is connected to the measurement probe 310 by a first acquisition channel 315 whereas the data processing module 340 is connected to the information module 320 by a second acquisition channel 325 which is here merged with a processing channel.

The management module 330 comprises an analog-digital converter 350 and a Field-Programmable Gate Array (FPGA) 360. The analog-digital converter 350 is configured to convert the analog temperature measurement received from the temperature measurement probe 310 into a digital value, so that it can be used by processing means such as a Field-Programmable Gate Array (FPGA) or a processor. The digital value thus obtained is then supplied to the Field-Programmable Gate Array (FPGA) 360 for processing. In particular, the Field-Programmable Gate Array (FPGA) 360 is configured to format the signals comprising the digital values received from the analog-digital converter 350 and detect failures or errors on said signals.

The processing module 340 comprises a Field-Programmable Gate Array (FPGA) 370 and a processor 380. The Field-Programmable Gate Array (FPGA) 360 communicates the digital value, via a processing channel 335, to the Field-Programmable Gate Array (FPGA) 370 coupled to the processor 380 for the processor 380 to process the data received from the management module 330. The FPGA 370 ensures, in particular, the management of the communications between the management module 330 and the processor 380.

The status of exceeding of a predefined tapped air flow temperature threshold, determined by the information module 320, can, for example, take the form of a discrete. The data processing module 340 is configured to receive from the information module 320, over the second acquisition channel 325, the status of exceeding of a predefined tapped air flow temperature threshold. In this embodiment of the system according to the invention, this status is supplied, by the information module 320, over the second channel 325 which is here also a processing channel, directly to the processor 380 for processing.

Thus, the separation of the communication links between the probe 310 and the processor 380 on the one hand and between the information module 320 and the processor 380 on the other hand, makes it possible to separate the acquisitions as far as the processor 380, that is to say reduce the common mode to just the processor 380.

Figure 4:
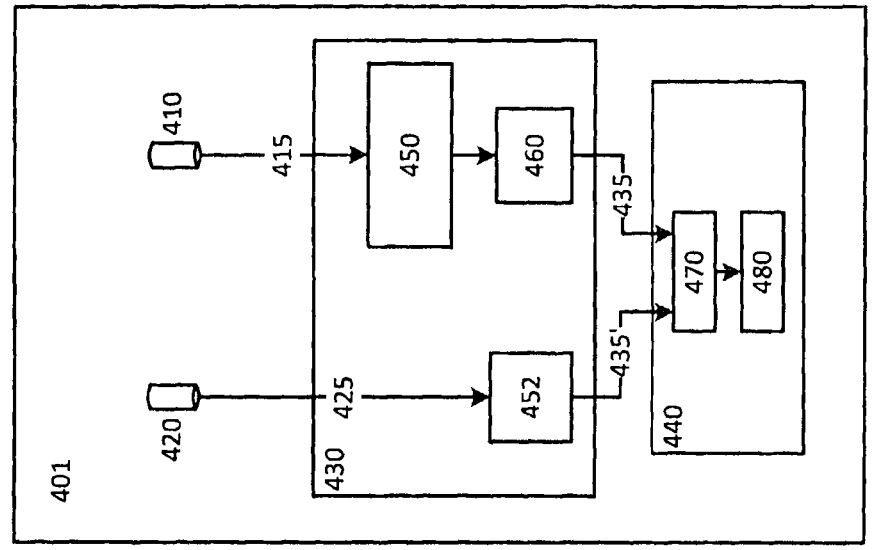
FIG. 4 illustrates a fifth embodiment of the system according to the invention.

In a fifth embodiment illustrated by FIG. 4, the system 401 comprises:
a temperature measurement probe 410,
a temperature threshold exceeding status information module 420,
a management module 430,
a data processing module 440.

The management module 430 is connected to the measurement probe 410 by a first acquisition channel 415 whereas the second management module 430b is connected to the information module 420 by a second acquisition channel 425.

The management module 430 comprises an analog-digital converter 450 and a Field-Programmable Gate Array (FPGA) 460.

The analog-digital converter 450 is configured to receive from the measurement probe 410, over the first channel 415, a tapped air flow temperature measurement measured by said probe 410.

The analog-digital converter 450 is, furthermore, configured to convert the analog temperature measurement received from the temperature measurement probe 410 into a digital value, such that it can be used by processing means such as a Field-Programmable Gate Array (FPGA) or a processor.

The digital value thus obtained is then supplied to the Field-Programmable Gate Array (FPGA) 460 for processing. In particular, the Field-Programmable Gate Array (FPGA) 460 is configured to format the signals comprising the digital values received from the analog-digital converter 450 and detect failures or errors on said signals.

The Field-Programmable Gate Array (FPGA) 460 makes it possible to process the digital values received from the analog-digital converter 450.

The management module 430 also comprises a second Field-Programmable Gate Array (FPGA) 452 configured to receive, from the information module 420, a status of exceeding of a predefined tapped air flow temperature threshold. Such a status here takes the form of a discrete.

The processing module 440 comprises a Field-Programmable Gate Array (FPGA) 470 and a processor 480.

The Field-Programmable Gate Array (FPGA) 460 communicates the digital value of the temperature measurement to the Field-Programmable Gate Array (FPGA) 470 over a first processing channel 435.

The Field-Programmable Gate Array (FPGA) 460 communicates the exceeding status to the second Field-Programmable Gate Array (FPGA) 452 over a second processing channel 435' making it possible to totally separate the measurement and the status as far as the FPGA 470.

The FPGA 470 notably ensures the management of the communications between the management module 430 and the processor 480. The FPGA 470 thus transmits the measurement or the status to the processor 480 for processing.

In this embodiment, the separation of the communication links between the probe 410 and the processing module 440 on the one hand and between the information module 420 and the processing module 440 on the other hand, makes it possible to separate the acquisitions as far as the data processing module 440, that is to say reduce the common mode to just the data processing module 440.

Figure 5:
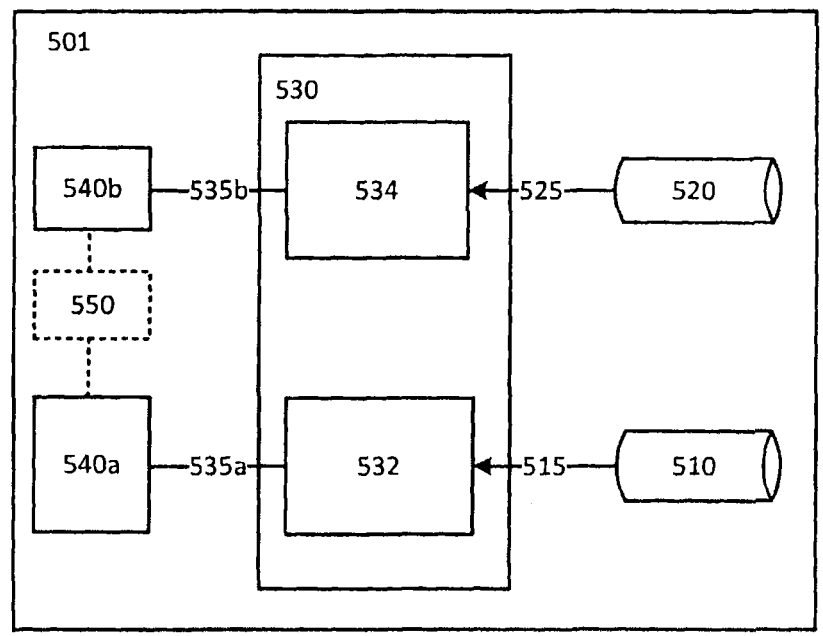
FIG. 5 illustrates a sixth embodiment of the system according to the invention.

In a sixth embodiment illustrated by FIG. 5, the system 501 comprises:
- a temperature measurement probe 510,
- a temperature threshold exceeding status information module 520,
- a management module 530,
- a first data processing module 540*a*,
- a second data processing module 540*b*.

The management module 530 is connected, on the one hand, by the acquisition channel 515, to the measurement probe 510 and, on the other hand, by the acquisition channel 525, to the information module 520.

The management module 530 comprises a first control module 532 configured to receive, from the measurement probe 510, over a first channel 515, a tapped air flow F temperature measurement M1 measured and sent by said probe 510.

The control module 532 communicates with the first data processing module 540*a* via a processing channel 535*a* and is configured to send to said first data processing module 540*a* the received measurement M1.

The first data processing module 540*a* then processes the received measurement M1 so as to allow for the control of the valves 5, 5', 5" of the system 501, for example by directly or indirectly sending commands or alerts to control said valves 5, 5', 5".

The management module 530 also comprises a monitoring module 534 configured to receive temperature information from the information module 520.

The information module 520 can here be, for example, a temperature measurement probe or a predefined temperature threshold exceeding status information module.

The information sent by the information module 520 and received by the monitoring module 534 can thus comprise a temperature measurement M2 or a status of exceeding of a predefined temperature threshold such as, for example, the result of a discrete, a binary result, etc.

The monitoring module 534 is, furthermore, coupled to the second data processing module 540*b* and is configured to send to said second data processing module 540*b* the received temperature information.

The second data processing module 540*b* then processes the data to make it possible to monitor the exceeding of a predefined tapped air flow temperature threshold, for example by directly or indirectly sending commands or alerts to control the air tapping valves of the system 501.

In this embodiment, the first data processing module 540*a* and the second data processing module 540*b* can be physically separate and each comprise a processor.

The first data processing module 540*a* and the second data processing module 540*b* can be coupled via a communication module 550, for example of Arinc® type, so as to allow for communication between them.

The first data processing module 540*a* can, for example, be implemented, that is to say set up, on an engine computer of the aircraft and the second data processing module 540*b* can, for example, be implemented on a dedicated computer, for example dedicated to the air tapping system of the aircraft, or on another engine computer of the aircraft.

In this case, the management module 530 can be physically split into two so that the control module 532 is implemented directly on one engine computer and the monitoring module 534 is implemented directly on the second computer.

In this embodiment, the separation of the communication links between the probe 510 and the first data processing module 540*a*, on the one hand, and between the information module 520 and the second data processing module 540*b*, on the other hand, makes it possible to fully separate the acquisitions and thus completely eliminate the common mode between the two temperature information items.

Alternatively, the second data processing module 540*b* can be configured to send the second temperature information to the first data processing module 540*a*, for example, via the communication module 550, so that the first data processing module 540 performs the processing of the second temperature information received and, for example, sends commands for opening and closing valves 5, 5', 5" of the air tapping system of the aircraft. In this case, the control of the air tapping temperature and the monitoring of the exceeding of a predefined air tapping temperature threshold can thus be performed by just the first data processing module 540*a* from the first information that it receives from the management module 530 and from the temperature information that it receives from the communication module 550. This makes it possible to separate the acquisitions of the two temperature information items by the use of two data processing modules separated, for example, between two computers of the aircraft, and to mutually secure the information used by the processing module 540*a*, the common mode being limited in this case to just the processing module 540*a*.

Figure 6:
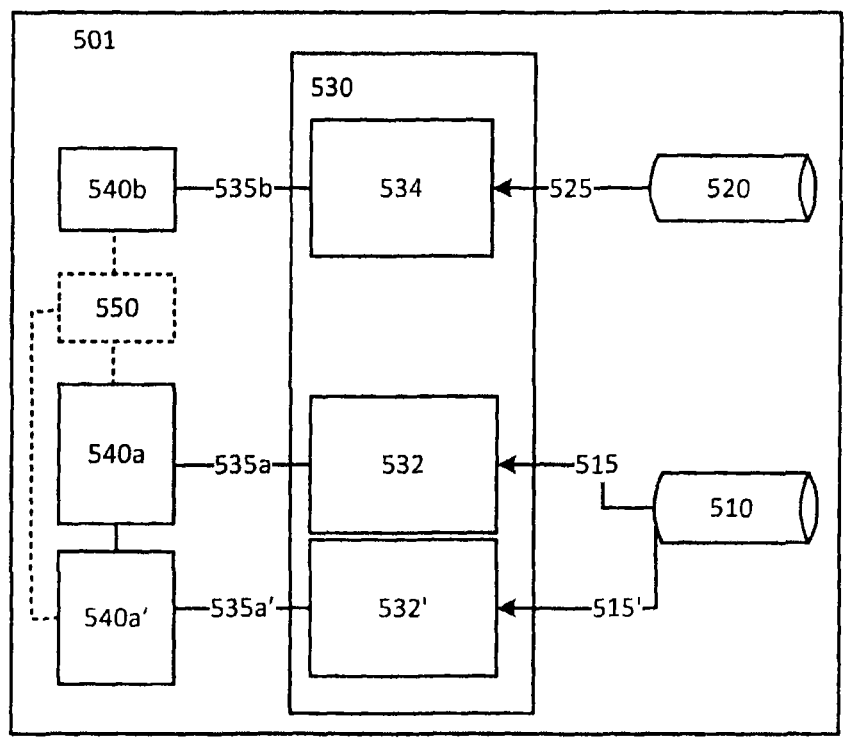
FIG. 6 illustrates a seventh embodiment of the system according to the invention.

In a seventh embodiment illustrated by FIG. 6, the system 501 also comprises a third data processing module 540*a*' and the management module also comprises a second control module 532'.

The second control module 532' is configured to receive, from the measurement probe 510, over a third channel 515', the tapped air flow F temperature measurement M1 measured and sent by said probe 510.

The control module 532' communicates with the third data processing module 540*a*' via a processing channel 535*a*' and is configured to send to said third data processing module 540*a*' the received measurement M1.

The third data processing module 540*a*' then processes the received measurement M1 so as to allow for the control of the valves 5, 5', 5" of the system 501, for example by directly or indirectly sending commands to control said valves 5, 5', 5".

The first data processing module 540*a* and the third data processing module 540*a*' can operate alternately, for example, one being main and active and the other being secondary and passive so that, if the main module fails, the secondary module can take over.

In this embodiment, the first data processing module 540*a* and the third data processing module 540*a*' can, for example, be implemented on an engine computer of the aircraft and the second data processing module 540*b* can, for example, be implemented on a computer that is dedicated, for example to the air tapping system of the aircraft, or on another engine computer of the aircraft.

In this case, the management module 530 can be physically split into two so that the control modules 532 and 532' are implemented directly on one engine computer and the monitoring module 534 is implemented directly on the second computer (dedicated or not).

When the control modules 532 and 532' are implemented on an engine computer comprising two physical channels, the channels 515 and 515' can be physically implemented respectively on the first physical channel and on the second physical channel of the engine computer.

In this embodiment, the separation of the communication links between the probe 510 and the first data processing module 540a and the third data processing module 540a', on the one hand, and between the information module 520 and the second data processing module 540b, on the other hand, makes it possible to separate the acquisitions fully, thus completely eliminating the common mode between the two temperature information items, and securing the acquisition of the first temperature information to perform the temperature control function.

Alternatively, the second data processing module 540b can be configured to send the second temperature information to the first data processing module 540a or to the third data processing module 540a', for example, via the communication module 550, so that the first data processing module 540 or the third data processing module 540a' performs the processing of the second received temperature information and, for example, sends commands for opening and closing valves 5, 5', 5" of the air tapping system of the aircraft.

The invention claimed is:

1. An air tapping system of an aircraft, the system comprising:
   at least one air tapping valve configured to tap an air flow on the aircraft;
   a first temperature information module configured to determine and send, over a first acquisition channel, first tapped air flow temperature information of the tapped air flow in a duct of the air tapping system;
   a second temperature information module configured to determine and send, over a second acquisition channel, second tapped air flow temperature information of the tapped air flow in the duct of the air tapping system;
   at least one management module, coupled to a data processing module and configured to:
      receive, over the first acquisition channel, the first tapped air flow temperature information which is used for a corresponding air tapping valve control of the air tapping valve,
      receive, over the second acquisition channel, the second tapped air flow temperature information which is used to monitor if the tapped air flow exceeds a predefined tapped air flow temperature threshold, and
      send the first temperature information and the second temperature information; and
   at least one data processing module, coupled to the management module, and configured to:
      receive, over a first processing channel, the first tapped air flow temperature information used for a corresponding air tapping valve control,
      receive, over a second processing channel, the second tapped air flow temperature information used to monitor if the tapped air flow exceeds the predefined tapped air flow temperature threshold, and
      execute the air tapping valve control of the air tapping valve based on the first tapped air flow temperature information if the tapped air flow exceeds the predetermined tapped air flow temperature threshold based on the second tapped air flow temperature information,
   wherein the first acquisition channel and the second acquisition channel are distinct from each other.

2. The air tapping system of an aircraft as claimed in claim 1, wherein the first temperature information module is configured to measure and send, over the first acquisition channel, a first tapped air flow temperature measurement, and
   the second temperature information module is configured to measure and send, over the second acquisition channel, a second tapped air flow temperature measurement or to determine and send, over the second acquisition channel, a status of exceeding of a predefined temperature threshold by the temperature of the tapped air flow.

3. The air tapping system of an aircraft as claimed in claim 1, wherein the first temperature information module is configured to measure and send, over the first acquisition channel, a first tapped air flow temperature measurement,
   the second temperature information module is configured to measure and send, over the second acquisition channel, a second tapped air flow temperature measurement, and
   the management module is configured to receive, from the first temperature information module, over the first acquisition channel, the first measurement and, from the second temperature information module, over the second acquisition channel, the second measurement,
   the management module being coupled to a processing module and the first and the second processing channels being identical.

4. The air tapping system of an aircraft as claimed in claim 1, further comprising a second management module coupled to a second data processing module by third and fourth identical processing channels and coupled to the first temperature information module and to the second temperature information module,
   the second management module configured to receive, from the first temperature information module, over a third acquisition channel, the first measurement and, from the second temperature information module, over a fourth acquisition channel, the second measurement.

5. The air tapping system of an aircraft as claimed in claim 1, wherein the first temperature information module is configured to measure and send, over the first acquisition channel, a first tapped air flow temperature measurement,
   the second temperature information module is configured to determine and send, over the second acquisition channel, a status of exceeding of a predefined temperature threshold by the temperature of the tapped air flow, and
   the management module is configured to receive, over the first acquisition channel, the temperature measurement and, over the second acquisition channel, the exceeding status,
   the first and the second processing channels being identical.

6. The air tapping system of an aircraft as claimed in claim 1, wherein the first temperature information module is configured to measure and send, over the first acquisition channel, a first tapped air flow temperature measurement,
   the second temperature information module is configured to determine and send, over the second acquisition channel, a status of exceeding of a predefined temperature threshold by the temperature of the tapped air flow,
   the management module is configured to receive, over the first acquisition channel, the temperature measurement, and
   the data processing module is configured to receive, over the second acquisition channel the exceeding status,
   the second acquisition channel and the second processing channel being identical.

7. The air tapping system of an aircraft as claimed in claim 1, wherein the first temperature information module is configured to measure and send, over the first acquisition channel, a first tapped air flow temperature measurement, the second temperature information module is configured to determine and send, over the second acquisition channel, a status of exceeding of a predefined temperature threshold by the temperature of the tapped air flow, the management module is configured to receive, over the first acquisition channel, the temperature measurement and, over the second acquisition channel, the exceeding status, the second acquisition channel and the second processing channel being distinct.

8. The air tapping system of an aircraft as claimed in claim 1, wherein the system comprises a first data processing module configured to receive, over the first processing channel, the first temperature information, and a second data processing module configured to receive, over the second processing channel, the second temperature information.

9. The air tapping system of an aircraft as claimed in claim 8, further comprising a third acquisition channel and a third data processing module configured to receive, over a third processing channel, the first temperature information.

10. The air tapping system of an aircraft as claimed in claim 1, wherein the management module includes an analog-digital converter and a Field-Programmable Gate Array.

11. A method for managing an air tapping system in an aircraft, the system including:

at least one air tapping valve configured to tap an air flow on the aircraft, first temperature information module configured to determine and send, over a first acquisition channel, first tapped air flow temperature information of the tapped air flow in a duct of the air tapping system, a second temperature information module configured to determine and send, over a second acquisition channel, second tapped air flow temperature information of the tapped air flow in the duct of the air tapping system, at least one management module, coupled to a data processing module and configured to:

receive, over the first acquisition channel, the first tapped air flow temperature information which is used for a corresponding air tapping valve control, receive, over the second acquisition channel, the second tapped air flow temperature information which is used to monitor if the tapped air flow a predefined tapped air flow temperature threshold, and send the first temperature information and the second temperature information, and at least one data processing module, coupled to the management module, and configured to:

receive, over a first processing channel, the first tapped air flow temperature information used for a corresponding air tapping valve control, and receive, over a second processing channel, the second tapped air flow temperature information used to monitor if the tapped air flow exceeds the predefined tapped air flow temperature threshold, the method comprising:

tapping a flow of air at least partly on the valve;

receiving, on the management module, from the first temperature information module via the first acquisition channel, the first temperature information of the tapped air flow;

receiving, on the management module or the data processing module, from the second temperature information module via the second acquisition channel, the second temperature information of the tapped air flow, receiving, on the data processing module, the first temperature information and the second temperature information;

controlling, on the data processing module, opening or closing of one or more air tapping valves as a function of the first temperature information if the tapped air flow exceeds the predetermined tapped air flow temperature threshold based on the second temperature information, wherein the first acquisition channel and the second acquisition channel are distinct from each other.

12. The air tapping system of an aircraft as claimed in claim 11, wherein the data processing module includes a Field-Programmable Gate Array and a processor.

* * * * *

UNITED STATES PATENT AND TRADEMARK OFFICE
CERTIFICATE OF CORRECTION

| | | |
|---|---|---|
| PATENT NO. | : 9,194,300 B2 | Page 1 of 1 |
| APPLICATION NO. | : 14/232736 | |
| DATED | : November 24, 2015 | |
| INVENTOR(S) | : Jerome Guy Roger Sebaa et al. | |

It is certified that error appears in the above-identified patent and that said Letters Patent is hereby corrected as shown below:

IN THE CLAIMS

Col. 17, line 33, change "first temperature" to --a first temperature--.

Signed and Sealed this
Fifth Day of April, 2016

Michelle K. Lee
*Director of the United States Patent and Trademark Office*